United States Patent
Watanabe et al.

(10) Patent No.: US 6,340,875 B1
(45) Date of Patent: Jan. 22, 2002

(54) ROBOT CONTROLLER

(75) Inventors: Atsushi Watanabe, Tokyo; Tetsuaki Kato, Hadano, both of (JP)

(73) Assignee: Fanuc Ltd., Yamanashi (JP)

( * ) Notice: Subject to any disclaimer, the term of this patent is extended or adjusted under 35 U.S.C. 154(b) by 0 days.

(21) Appl. No.: 09/468,641

(22) Filed: Dec. 22, 1999

(30) Foreign Application Priority Data

Mar. 25, 1999 (JP) ............................................ 11-081909

(51) Int. Cl.$^7$ ............................................. G05B 19/42
(52) U.S. Cl. ............................. 318/568.11; 318/568.2; 318/568.18; 318/568.21
(58) Field of Search ........................ 318/568.11, 568.18, 318/568.2, 568.21

(56) References Cited

U.S. PATENT DOCUMENTS

| | | | |
|---|---|---|---|
| 4,249,062 A | * 2/1981 | Hozumi et al. | 219/124.34 |
| 4,469,930 A | * 9/1984 | Takahashi | 219/121 LN |
| 4,613,743 A | * 9/1986 | Nied et al. | 219/130.21 |
| 4,682,335 A | * 7/1987 | Hughes | 372/6 |
| 4,689,756 A | * 8/1987 | Koyama et al. | 364/513 |
| 4,894,598 A | * 1/1990 | Daggett | 318/568.16 |
| 4,985,668 A | * 1/1991 | Nakazumi et al. | 318/568.2 |
| 5,241,250 A | * 8/1993 | Nagasawa et al. | 318/591 |
| 5,465,037 A | * 11/1995 | Huissoon et al. | 318/568.11 |
| 5,467,003 A | * 11/1995 | Kosaka et al. | 318/568.13 |
| 5,484,975 A | * 1/1996 | Itatsu | 219/86.7 |
| 5,645,884 A | * 7/1997 | Harlow, Jr. et al. | 427/8 |
| 5,798,627 A | * 8/1998 | Gilliland et al. | 318/568.14 |
| 5,906,761 A | * 5/1999 | Gilliland et al. | 219/124.34 |

FOREIGN PATENT DOCUMENTS

| | | |
|---|---|---|
| JP | 61226198 A | 10/1986 |
| JP | 03016675 A | 1/1991 |
| JP | 03086376 A | 4/1991 |
| JP | 05008037 A | 1/1993 |
| JP | 05138087 A | 6/1993 |
| JP | 05168998 A | 7/1993 |
| JP | 05-291649 | 11/1993 |
| JP | 06155026 | 6/1994 |
| JP | 06179077 A | 6/1994 |
| JP | 07202979 A | 11/1995 |
| JP | 07-303966 | 11/1995 |

* cited by examiner

*Primary Examiner*—Marlon T. Fletcher
*Assistant Examiner*—Rita Leykin
(74) *Attorney, Agent, or Firm*—Staas & Halsey LLP (57) ABSTRACT

A robot controller which controls a process controlled variable of an operational tool mounted on a robot in synchronism with the robot motion. The position of each axis of the robot is detected by a sensor such as a position detector. In a calculating section, motion variables such as position $P_n$, velocity $v_n$ and acceleration $\alpha_n$ of a tool center point (TCP) are detected from the respective positions of the robot axes. An ideal output (target value) of a sensor for detecting a controlled variable to be controlled in accordance with the motion state is determined in a calculating section. A sensor output is subtracted from the target value to determine a deviation. The deviation is multiplied by a proportional gain K to determine a manipulated variable. By using this manipulated variable, the process of an arc welding machine, sealing machine, or laser beam machine in which a tool is mounted on a distal end of a robot wrist is controlled. The target value is determined in accordance with the change of motion state of the robot, and feedback control is carried out so as to follow the target value so that uniform operation is achieved.

13 Claims, 6 Drawing Sheets

ROBOT CONTROLLER

BACKGROUND OF THE INVENTION

1. Field of the Invention

The present invention relates to control of peripheral equipment of a robot, and more particularly to control of a tool mounted on a distal end of a robot wrist, which has variables to be controlled in synchronism with a motion of the robot.

2. Description of Related Art

Peripheral equipment of a robot is generally controlled so that an on/off signal is output from a robot controller and a synchronization is made in a degree such that the operation of the peripheral equipment is started and stopped based on the on/off signal.

For example, in the case of a sealing robot which applies sealing material to an object in operation of the robot by means of a sealing gun mounted on a distal end of a robot wrist, a flow control of the sealing material is generally carried out so that a sealing-on signal is output from a robot controller to start the operation of the sealing gun when a nozzle tip of the sealing gun is positioned at a start point of a portion to be sealed, and a sealing-off signal is output from the robot controller to stop the operation of the sealing gun when the nozzle tip of the sealing gun reaches an end point of the sealing portion.

However, if a flow rate of sealing material discharged from the sealing gun is constant, quantity of the sealing material applied on the object changes depending on velocity of a tool center point (TCP) of the robot, i.e., velocity of the sealing gun. In this view, there has been developed and disclosed a method of making quantity of the applied material constant by changing the flow rate of the sealing material in accordance with the commanded velocity of the robot in Japanese Patent No. 2700971.

As described, the relationship between the robot and the peripheral equipment thereof is generally such that the peripheral equipment is on/off controlled based on an on/off signal output from the robot controller. Therefore, in the case where process control of variables such as flow rate and pressure is required for a tool such as a sealing gun mounted on the distal end of the robot wrist, high operational quality is hardly obtained merely by the on/off control. Also, in the above-described method disclosed in Japanese Patent No. 2700971, only the flow rate of the sealing material is changed in accordance with the commanded velocity of the robot, and the flow rate is not subjected to feedback control. This leads to a problem in that the flow rate sometimes does not agree with the target flow rate due to an operational environment such as an ambient temperature, and therefore various compensations have to be made.

SUMMARY OF THE INVENTION

An object of the present invention is to provide a robot controller capable of controlling process controlled variables of an operational tool mounted on a robot.

According to one aspect of the invention, the robot controller comprises motion control means for moving an operational tool mounted on a robot with respect to an object; supply means for supplying energy to be applied to the object through the operational tool; supply control means for issuing a supply command to the supply means, the supply command being determined based on motion variable of the operational tool in motion obtained by the motion control means; and means for feeding back a parameter representing power of the energy supplied through the operational tool to alter the supply command based on the fed back parameter.

The motion variable may be a velocity of a control point of the robot relative to the object. The supply means may be a power source for supplying a welding current, a laser oscillator for supplying a laser beam, or an electric motor for driving a pump for supplying sealing material or paint.

In the case where the supply means is the welding power source, the fed back parameter may be a welding current, and in the case where the supply means is the laser oscillator, the fed back parameter may be an excitation current of the laser oscillator.

Further, the supply means may supply energy to an operational substance to be fused so as to apply the fused operational substance to the object through the operational tool. In this case, a parameter representing power of the energy supplied to the operational substance is fed back. The operational substance may be a filler metal, and the fed back parameter may be a welding current.

According to another aspect of the invention, supply means supplies an operational substance to be applied to an object through an operational tool, a parameter representing the supply rate of the operational substance supplied through the operational tool is fed back, and a supply command is altered based on the fed back parameter. In this case, the supply means may be an electric motor for driving a pump for supplying sealing material or paint, and the fed back parameter may be a pressure of the sealing material or paint at an outlet of the operational tool.

DETAILED DESCRIPTION OF THE PREFERRED EMBODIMENTS

Figure 1:
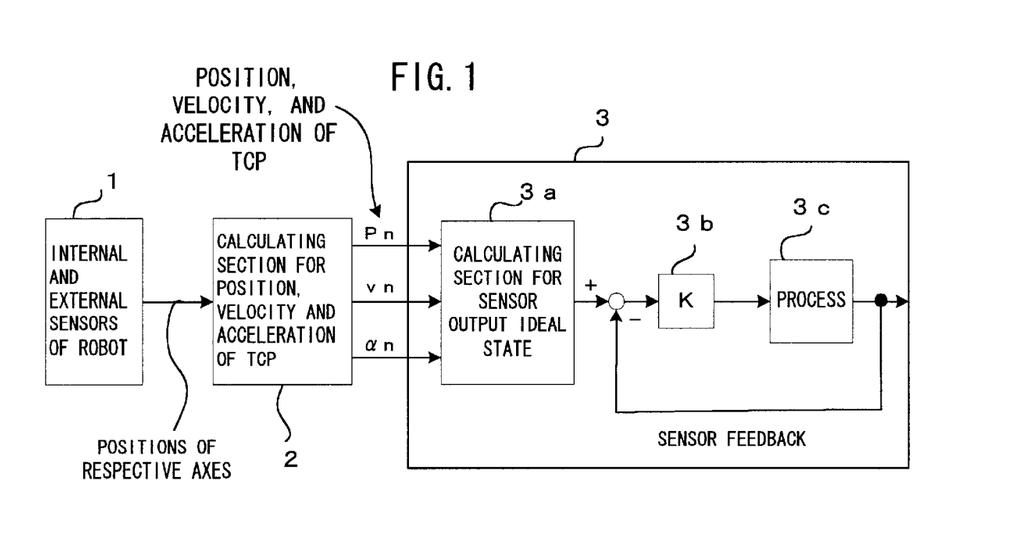
FIG. 1 is a schematic diagram for explaining the principle of motion in accordance with the present invention.

FIG. 1 is a schematic diagram for explaining an operational principle of the present invention. In the present invention, the positions on robot axes are determined by various internal and external sensors of the robot 1, and a position $P_n$, a velocity $v_n$ and an acceleration $\alpha_n$ of a TCP (tool center point; robot control point which is set at a center point of an end effector) are determined in a calculating section 2 based on the respective axes positions, and transferred to a process control loop 3 for controlling the process of an operational tool mounted on a distal end of a robot wrist.

In the process control loop 3, an ideal state of output of a sensor for detecting a controlled variable of a controlled object is determined in a sensor output ideal-state calculating section 3a, which constitutes supply control means, based on the position $P_n$, velocity $v_n$ and acceleration $\alpha_n$ of the TCP as motion variables of the operational tool. In other words, a target value, which is an ideal value of the controlled variable detected by the sensor, is determined. Then, a deviation between the value in the ideal state (target value) and an actual value of the controlled variable detected by the sensor is obtained, and the deviation is multiplied by a proportional constant K (element 3b) to determine the manipulated variable, which is used as a control input for a process (3c) of the controlled object.

The above is a description of the principle of synchronous operation of the peripheral equipment with the robot in which the tool (peripheral equipment) mounted on the distal end of the robot requires process control in synchronism with the robot motion.

Figure 5:
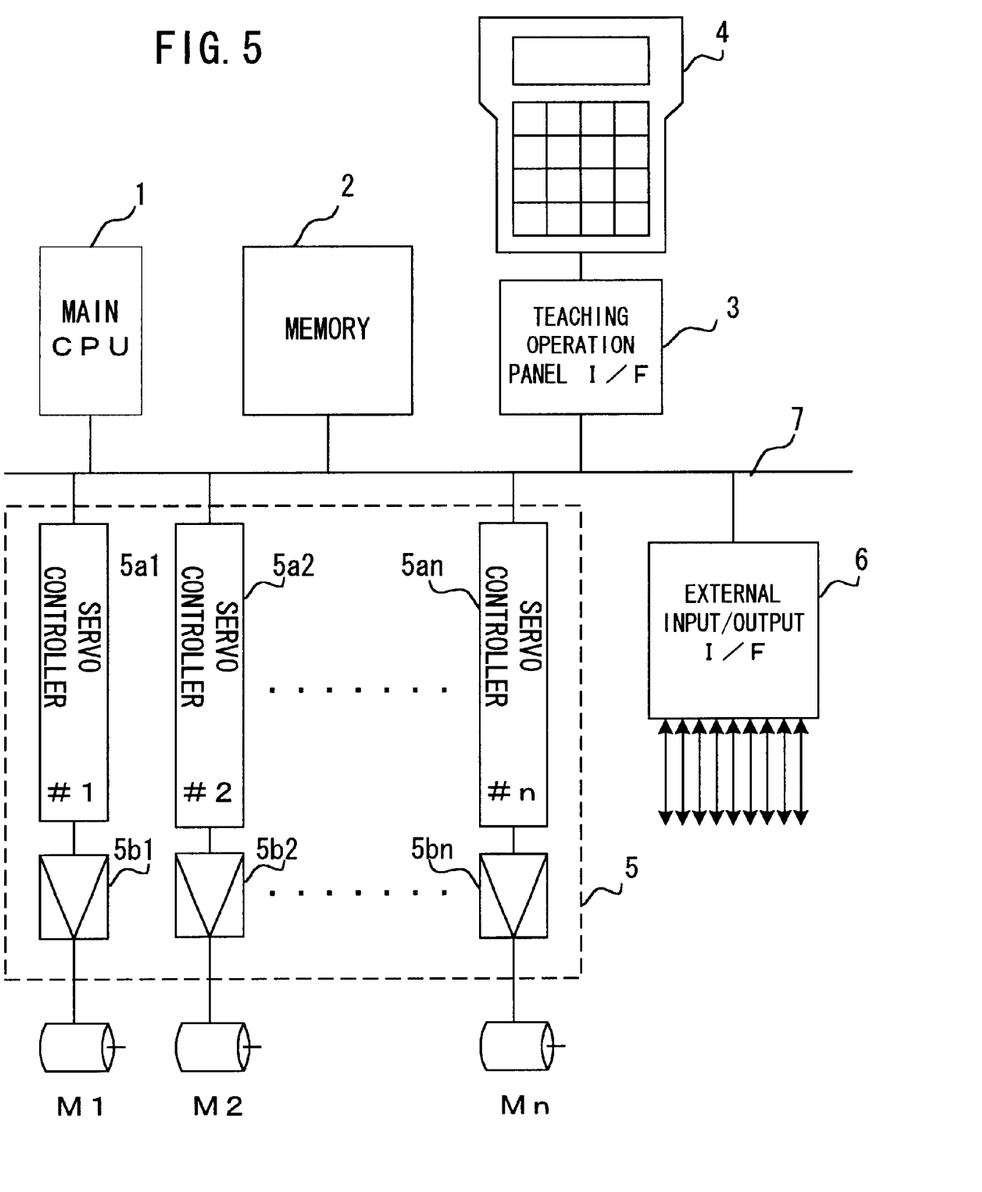
FIG. 5 is a block diagram of a robot controller in the embodiment.

FIG. 5 is a block diagram of an essential portion of a robot controller for controlling the above-described peripheral equipment (tool) requiring the process control. A main processor 1, a memory 2 consisting of RAM, ROM, and nonvolatile memory (EEPROM etc.), an interface 3 for teaching operation panel, an interface 6 for external devices, and a servo control section 5 are connected to a bus 7. A teaching operation panel 4 is connected to the interface 3 for teaching operation panel.

A system program for supporting the basic functions of the robot and the robot controller is stored in the ROM of the memory 2. Also, a robot operation program taught for a specific application and associated set data are stored in the nonvolatile memory of the memory 2. The RAM of the memory 2 is used for temporary storage of data in various kinds of calculation processing performed by the processor 1.

The servo control section 5 has servo controllers $5_{a1}$ to $5_{an}$ (n: total number of robot axes, including the number of operational axes set to the tool mounted on the distal end of the robot wrist). Each of the servo controllers $5_{a1}$ to $5_{an}$ is composed of a processor, ROM, RAM, etc. to carry out position and speed loop control of a servomotor for driving each axis and further to carry out current loop control. The servo controller consists of a so-called digital servo controller which carries out loop control of position, speed and current by means of software. The output of the servo controller $5_{a1}$ to $5_{an}$ controls the servomotor M1 to Mn for each axis through a servo amplifier $5_{b1}$ to $5_{bn}$. Although not shown in the figure, each of the servomnotors M1 to Mn is provided with a position/speed detector by which the position and speed of each servomotor detected by the position/speed detector is fed back to each of the servo controllers $5_{a1}$ to $5_{an}$. Also, the input/output interface 6 is connected with sensors provided on the robot and actuators and sensors of the peripheral equipment.

According to the present invention, process control for the processing shown in FIG. 1 is carried out by the robot controller having the above-described hardware constitution, with respect to the tool (peripheral equipment) mounted on the distal end of the robot wrist and requiring the process control in the peripheral equipment connected to the input/output interface 6.

Figure 6:
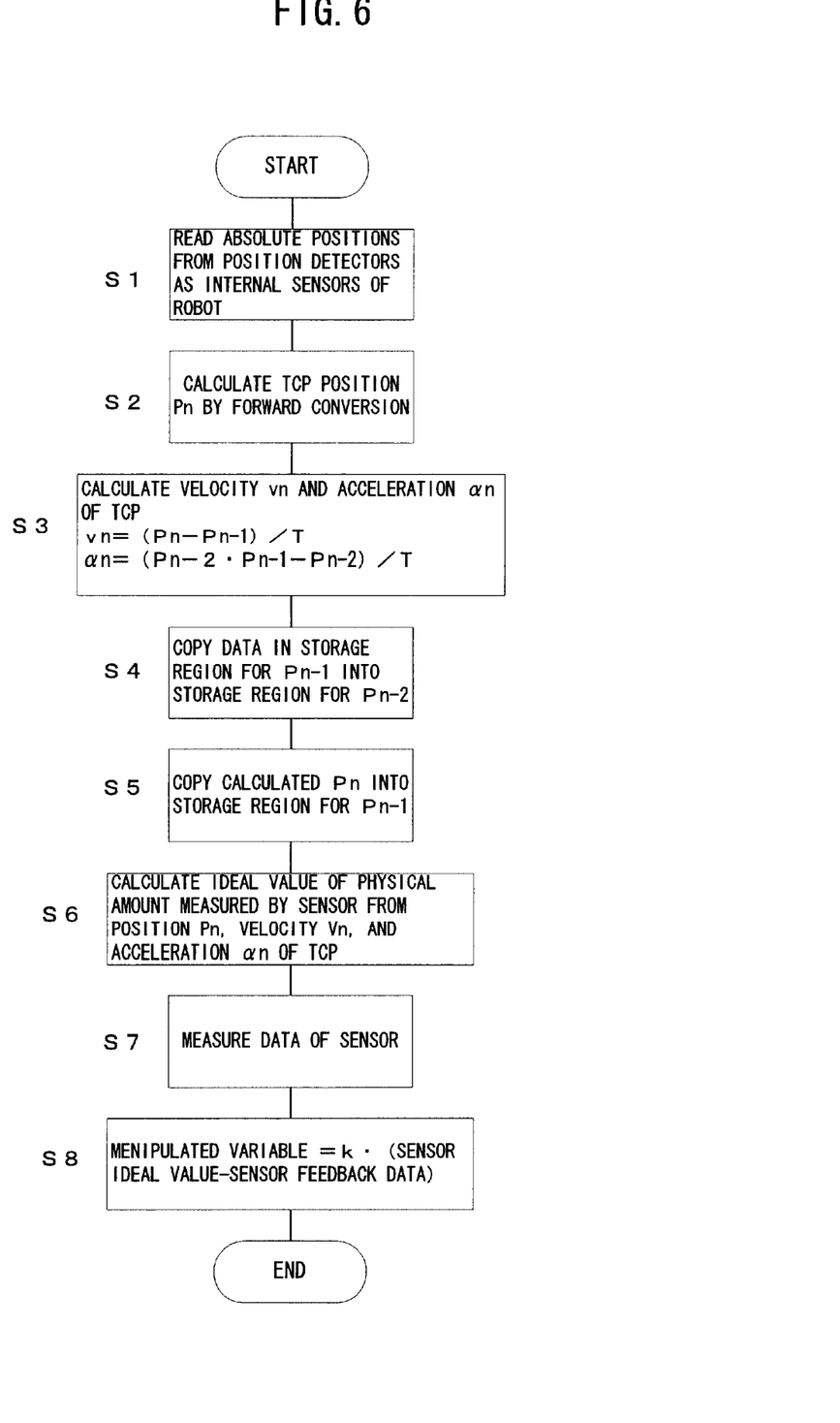
FIG. 6 is a flowchart for process control processing for peripheral equipment executed by a main processor of a robot controller in the embodiment.

FIG. 6 is a flowchart of processing, as shown in the schematic diagram of FIG. 1 showing the principle of operation, to be executed by the main processor 1 of the robot controller for each predetermined period to determine the manipulated variable to be output to the peripheral equipment requiring the process control.

First, an absolute position is read from a position detector for detecting the position on each axis of the robot, which is an internal sensor of the robot (Step S1). Based on the read axes position, generally called forward conversion processing is performed using a physical property such as a length of each arm of the robot to determine the position $P_n$ of TCP on a reference rectangular coordinate system (Step S2).

Next, the TCP position $P_{n-1}$ in the last period which has been determined in the last period and stored in the memory is subtracted from the TCP position $P_n$ determined in Step S2, and the difference is divided by a time interval T of the processing period to determine a velocity $v_n$ of motion of TCP. Further, the acceleration $\alpha_n$ is determined from the TCP position $P_{n-1}$ in the last period, the TCP position $P_{n-2}$ in the period before last, and the TCP position $P_n$ in the present period (Step S3).

$$V_n=(P_n-P_{n-1})/T$$
$$\alpha_n=(v_n-v_{n-1})/T=[\{(P_n-P_{n-1})/T\}-\{(P_{n-1}-P_{n-2})/T\}]/T=(P_n-2\cdot P_{n-2})/T^2$$

The data in a storage region of the memory storing the TCP position $P_{n-1}$ in the last period is copied into a storage region of the memory storing the TCP position $P_{n-2}$ in the period before last (Step S4).

The TCP position $P_n$ determined in Step S2 is copied into a memory region storing the TCP position $P_{n-1}$ in the last period (Step S5).

Next, the target value of a physical quantity (controlled variable) detected by the sensor is calculated from the TCP position $P_n$, velocity $v_n$, and acceleration $\alpha_n$ determined in Steps S2 and S3 (Step S6). Further, the detected value sent from the sensor is read as the detected data via the input/output interface 6 (Step S7). The data fed back from the sensor is subtracted from the ideal value sent from the sensor, which is the target value determined in Step S6, and the difference is multiplied by a proportional gain K to determine the manipulated variable, which is supplied to the tool mounted on the distal end of the robot wrist via the input/output interface 6. The peripheral equipment is controlled so that the magnitude of the controlled variable driven by the manipulated variable and detected by the sensor agrees with the target value, which is the ideal value sent from the sensor. The processing in Step S6 constitutes the supply control means of the present invention. The following is a description of examples in which the present invention is applied to an arc welding machine, a sealing material or paint coating machine, and a laser beam machine as the peripheral equipment requiring process control.

<In a case where the peripheral equipment is an arc welding machine>

Arc welding is preformed by fusing a metal to be welded with persistent luminescent electric discharge (arc) being used as a heat source, or by fusing a filler metal (welding rod) and applying it to an object. A welding torch of an arc welding machine is mounted on the distal end of the robot wrist, and a welding current flowing in the welding torch is controlled, by which energy applied for welding is controlled to control welding.

In the present invention, the welding current is further controlled as the controlled variable by the robot according to the movement velocity of the welding torch so that the power of applied energy per unit welding distance is made uniform, whereby a weld bead is made uniform.

Figure 2:
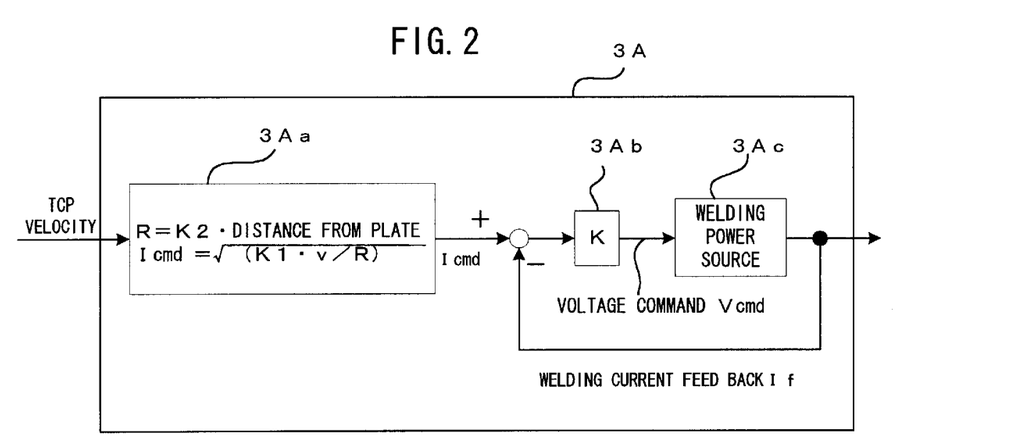
FIG. 2 is a block diagram of a process control section in accordance with one embodiment of the present invention when peripheral equipment is an arc welding machine.

FIG. 2 is a block diagram of a process control section when the peripheral equipment is an arc welding machine. A tool center point velocity is supplied to a process control loop 3A, which is a welding current control loop for arc welding, from the calculating section 2 for calculating position, velocity, and acceleration in FIG. 1. The process control loop 3A has a sensor output ideal state calculating section 3Aa for determining the target value of welding current (ideal output value of a sensor for measuring welding current), which is the controlled variable, from the tool center point velocity. A welding current value $I_f$ which is detected by the sensor and fed back is subtracted from the target value $I_{cmd}$ of welding current supplied from the sensor output ideal state calculating section 3Aa to determine the deviation, and the deviation is multiplied by the proportional constant K (element 3Ab) to determine a voltage command $V_{cmd}$ as the controlled variable. The welding current (3Ac) is controlled by this voltage command $V_{cmd}$.

The sensor output ideal state calculating section 3Aa changes the target value $I_{cmd}$ of welding current, which is the controlled variable, according to the tool center point velocity. Specifically, in order to obtain a uniform weld bead, the energy supplied for welding by the welding machine has only to be uniform per unit movement distance. Therefore, if the tool center point velocity is high, the welding distance per unit time increases, so that the applied energy must be increased. This means that the power of energy applied for welding must be changed in proportion to tool center point velocity $v_n$. Taking the power of applied energy as E, the welding current as I, and the resistance from the welding torch tip (tool tip) to a weld point of the object to be welded as R, $E=RI^2$. In order for the weld bead to be always kept constant even if the velocity v of the welding torch tip (tool center point) changes, the relationship expressed by the following equation (1) has only to hold.

$$E=RI^2=K1 \cdot v_n \quad (1)$$

where, K1 is a proportional constant. From Eq. (1), the target value $I_{cmd}$ of the welding current I, which is the controlled variable, is expressed as $$I_{cmd}=(K1 \cdot v_n/R)^{1/2} \quad (2)$$

Also, since the resistance R from the welding torch tip to a weld point of the object to be welded is proportional to the distance between them, the resistance R is expressed as $$R=K2 \cdot (\text{distance between welding torch tip and object}) \quad (3)$$

Thereupon, the target value $I_{cmd}$ of the welding current can be determined from the above equations (2) and (3).

Figure 7:
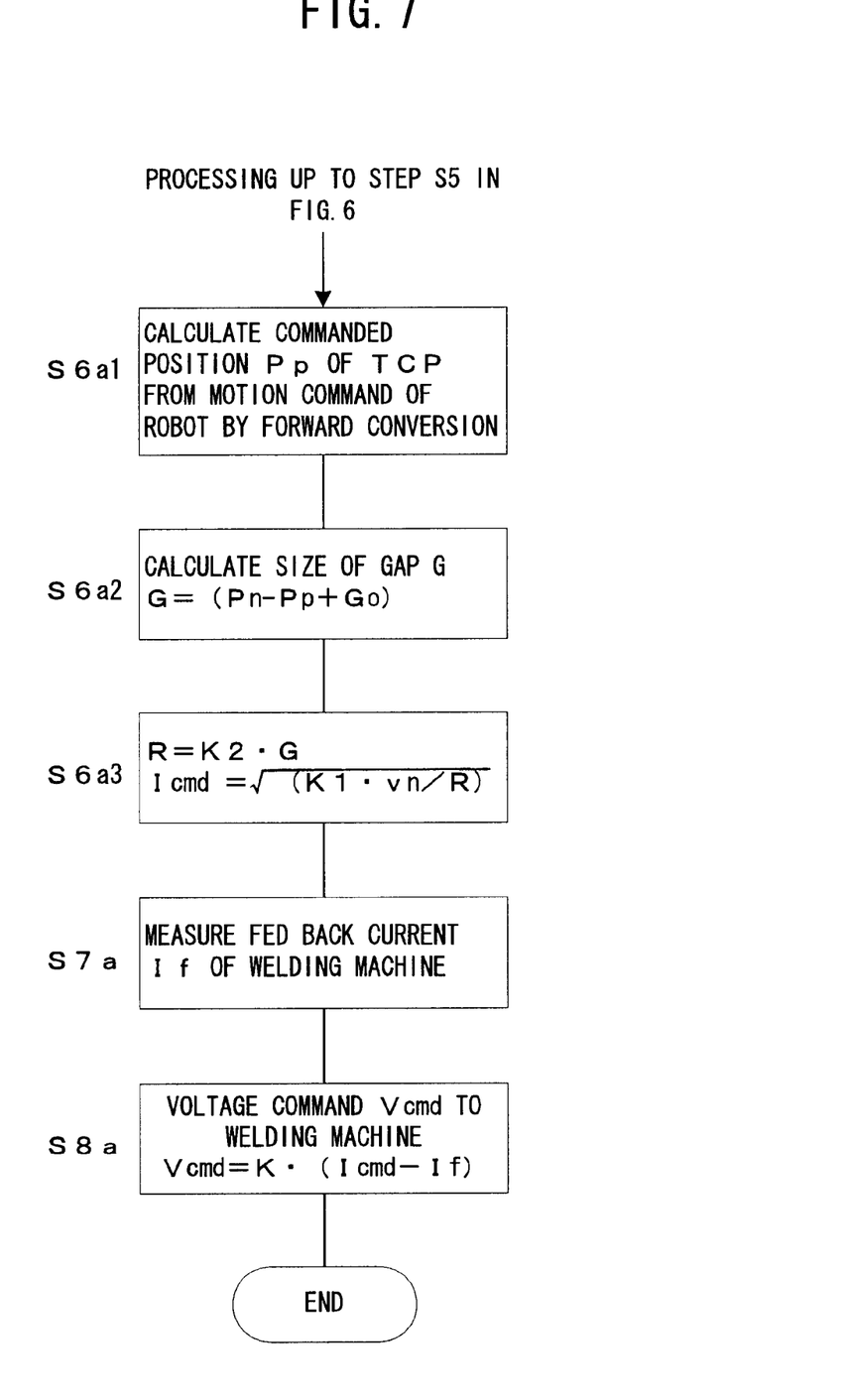
FIG. 7 is a flowchart for processing in a process control section when the peripheral equipment is an arc welding.

FIG. 7 is an essential portion of a flowchart for processing in each predetermined period of the main processor 1 which controls the welding current of the arc welding machine, which is the peripheral equipment.

In the processing for controlling the welding current of the arc welding machine, the processing in Step S6 is executed after the processing from Step S1 to Step S5 in FIG. 6 has been performed. In the control of the arc welding machine, the processing in Step S6 is replaced by the processing in Steps S6a1, S6a2 and S6a3 in FIG. 7, the processing in Step 7 is replaced by the processing in Step S7a, and the processing in Step S8 is replaced by the processing in Step S8a.

After the processing in Steps S1 to S5 is executed to determine the TCP position $P_n$, velocity $v_n$, and acceleration $\alpha_n$ in the present period, a robot motion command is first read by means of the taught operational program, and a commanded position $P_p$ of TCP is determined by forward conversion (Step S6a1). If the taught operational program has been produced at the TCP position $P_p$ on the reference orthogonal coordinate system, the processing of forward conversion need not be performed, and the read data is data of the TCP position $P_p$.

Next, a size $G_n$ of a gap between the TCP and a weld point position is determined from the commanded value $P_p$ of TCP position and the present position $P_n$. Specifically, the size $G_n$ of a gap between the weld torch tip position and the weld point position is determined. In this embodiment, a weld line of the object lies on the X-Y plane on the reference orthogonal coordinate system, and the welding torch is disposed in the plus direction of Z axis above the plane on which the weld line of the object lies, so that a position which is apart from the welding torch tip (TCP) by a predetermined gap size $G_0$ in the plus direction of Z axis is taught as the weld line. Therefore, the size $G_n$ of the gap in the present period is determined as follows: The position $P_p$ commanded by the taught operational program is subtracted from the present position $P_n$ of TCP to determine a position deviation between the present position $P_n$ and the position $P_p$ commanded by the taught operational program, and the size $G_0$ of the gap at the time of teaching is added to this position deviation (Step S6a2).

$$G_n=P_n-P_p+G_0 \quad (4)$$

By using the gap $G_n$ thus obtained, the processing of Eq. (3) is performed to determine the resistance R, and further the processing of Eq. (2) is performed to determine the commanded current $I_{cmd}$ as the target welding current (Step S6a3). The measured value $I_f$ of welding current fed back from the welding machine is read via the input/output interface 6 (Step S7a), and a value obtained by subtracting the fed back current $I_f$ from the commanded current $I_{cmd}$ is multiplied by the proportional gain K to obtain the voltage command $V_{cmd}(=K \cdot (I_{cmd}-I_f))$ and give it to the welding machine (Step S8a). Thereby, the processing in the present process period is completed. Subsequently, for each period, the processing in Steps S1 to S5 in FIG. 6 and Steps S6a1, S6a2, S6a3, S7a and S8a in FIG. 7 is executed to change the welding current of the welding machine according to the movement velocity of the welding torch (tool), whereby control is carried out so that uniform energy is always applied to each unit weld movement distance to make the weld bead uniform.

<In a case where the peripheral equipment is a sealing machine or a painting machine>

In the case of a sealing machine which applies a sealing material to an operational object or a painting machine which applies paint to an operational object, the pressure of sealing material at the outlet of a sealing gun for discharging the sealing material or the pressure of paint at the outlet of a painting gun for spraying paint is proportional to the flow rate of discharge or spray, so that the flow rate of the sealing material or paint is controlled by measuring the pressure by using a sensor. Therefore, in the sensor output ideal state calculating action 3a, a pressure detected by this sensor is an ideal output of pressure corresponding to the flow rate, so that this pressure is output as the target value.

Figure 3:
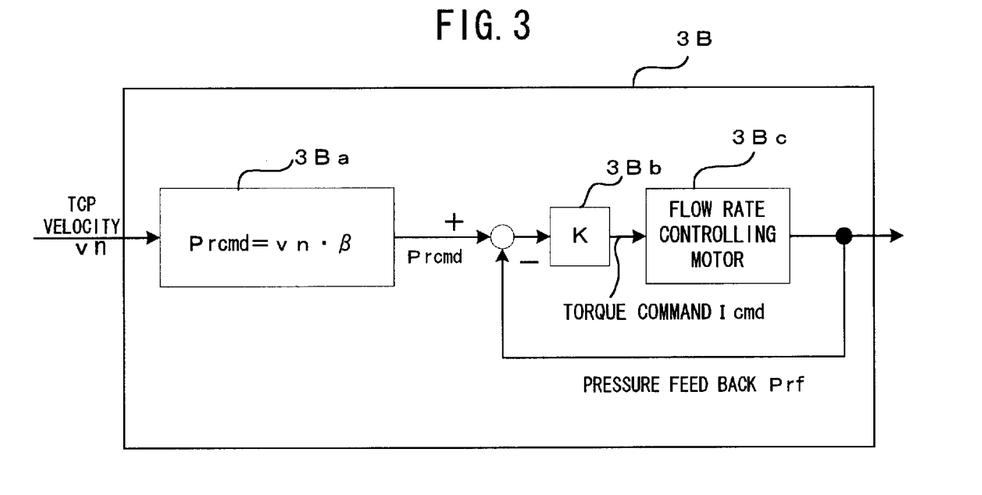
FIG. 3 is a block diagram of a process control section in accordance with one embodiment of the present invention when peripheral equipment is a sealing machine or a painting machine.

FIG. 3 is a block diagram of a process control section 3 for a sealing machine or a painting machine. The sealing gun of the sealing machine or the painting gin of the painting machine is mounted on the distal end of the robot wrist. When a distal end velocity (tool center point velocity) $v_n$ of the sealing gun or the painting gun is supplied to the sensor output ideal state calculating section 3B$a$, the sensor output ideal state calculating section 3B$a$ determines a target commanded pressure $P_{rcmd}$ by multiplying the tool distal end velocity $v_n$ by a conversion factor $\beta$ and outputs it. A pressure $P_{rf}$ of the sealing material or paint at the outlet of the nozzle, which is detected by the sensor and fed back, is subtracted from the commanded pressure $P_{rcmd}$ to determine the pressure deviation, and the pressure deviation is multiplied by the proportional gain K (element 3B$b$) to determine a torque command (current command) as the manipulated variable. Thereby, a motor 3B$c$ for controlling the flow rate of a pump for discharging the sealing material or paint is driven by this torque command.

The above is a description of the process control of the sealing machine or painting machine. In the present invention, this control is carried out by the main processor 1 of the robot controller. The main processor 1 executes the processing shown in FIG. 6 for each predetermined period, but the precessing in Steps S6, S7 and S8 in FIG. 6 is replaced by the processing in Steps S6$b$, S7$b$ and S8$b$ in FIG. 8, respectively. After performing the processing in Steps S1 to S5 described before, the main processor 1 determines the tool center point velocity (velocity of nozzle tip of the sealing gun or painting gun) $v_n$, and multiplies the determined velocity $v_n$ by the conversion factor $\beta$ to determine the target commanded pressure $P_{rcmd}$ (Step S6$b$). Then, the main processor 1 reads the pressure $P_{rf}$ of the sealing material or paint at the outlet of the nozzle, which is detected by the sensor and fed back, and multiplies a value obtained by subtracting the detected and fed back pressure $P_{rf}$ from the target commanded pressure $P_{cmd}$ by the proportional gain K to determine the current command (torque command) for the flow rate controlling motor. Thereafter, the current command is given to the flow rate controlling motor of the sealing machine or painting machine via the external input/output interface 6, thereby completing the processing in the present period (Steps S7$b$ and S8$b$).

Figure 8:
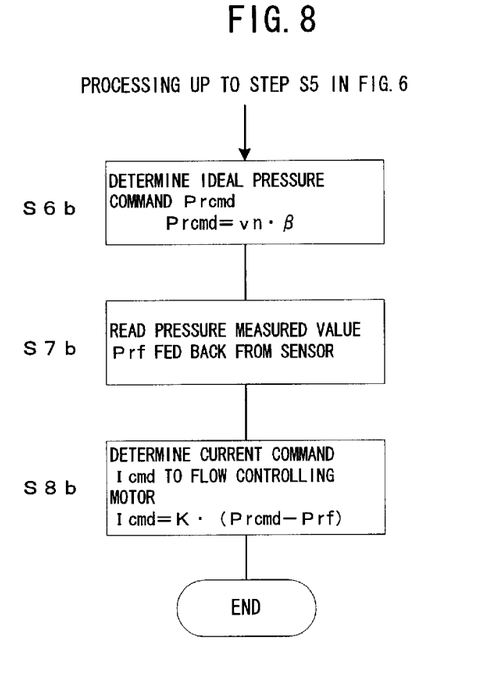
FIG. 8 is a flowchart for processing in a process control section when the peripheral equipment is a sealing machine or a painting machine.

Subsequently, the processing in Steps S1 to S5 and Steps S6$b$, S7$b$ and S8$b$ is executed repeatedly for each predetermined period. The target commanded pressure is determined according to the tool center point velocity (velocity of nozzle tip of the sealing gun or painting gun), and feedback control is carried out so that the pressure detected by the sensor agrees with the target commanded pressure. Therefore, the flow rate of the sealing material or paint discharged from the nozzle of the sealing machine or painting machine changes in proportion to the tool center point velocity, so that the quantity of the sealing material or paint discharged per unit movement distance becomes constant, and a uniform bead width of sealing material or paint width and a uniform thickness can be obtained.

<In a case where the peripheral equipment is a laser beam machine>

In this case, a laser beam machining head is mounted on the distal end of the robot wrist. By changing the laser intensity of a laser oscillator according to the nozzle tip velocity of the laser beam machining head, the power of or energy applied per unit movement distance of the laser beam machining head is made constant, so that laser beam machining of uniform quality can be achieved even if the movement velocity changes.

In the case of laser machining, applied energy E is proportional to the square of an excitation current I flowing in the laser oscillator. By changing the applied energy in proportion to the movement velocity $v_n$ of the laser beam machining head, the energy applied per unit movement distance can be made constant. Specifically, the following equation holds.

$$E = k1 \cdot I^2 = k2 \cdot v_n \quad (5)$$

$$I = (K1 \cdot v_n)^{1/2} \quad (6)$$

where, k1, k2 and K1 are constants.

If the driving current I of the laser oscillator is changed according to the velocity $v_n$ of the laser beam machining head so that the above equation (6) holds, the energy applied per unit movement distance is made uniform even if the velocity changes, so that laser machining of uniform quality can be achieved.

Figure 4:
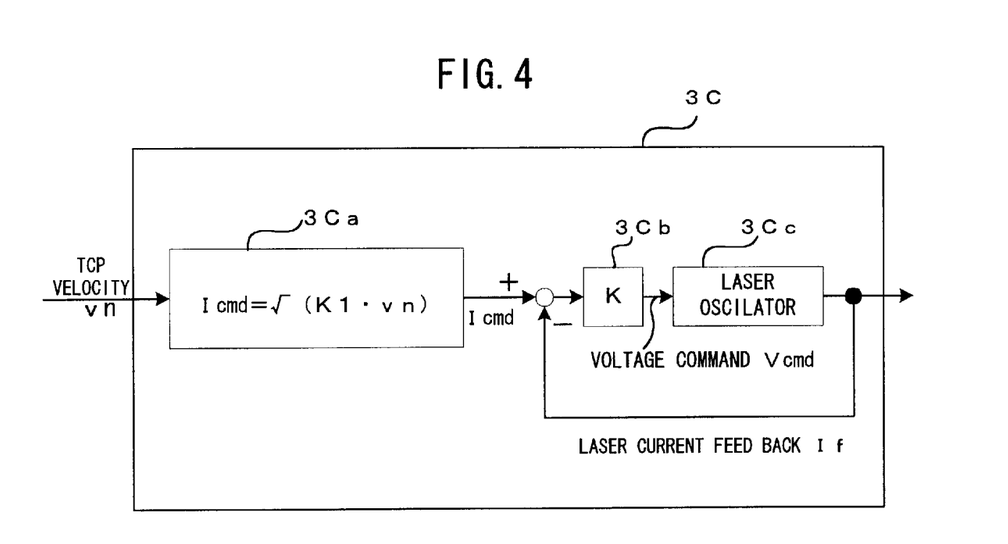
FIG. 4 is a block diagram of a process control section in accordance with one embodiment of the present invention when peripheral equipment is a laser beam machine.

FIG. 4 is a block diagram of the process control section 3 for a laser beam machine. In the sensor output ideal state calculating section 3C$a$ of the laser beam machine, a target current command $I_{cmd}$ is determined by performing the calculation in Eq. (6) using the tool center point velocity (movement velocity of nozzle tip of the laser beam machining head). A fed back value $I_f$ of driving current of the laser oscillator, which is detected by a sensor, is subtracted from the target current command $I_{cmd}$ to determine the current deviation. This current deviation is multiplied by the proportional gain K (element 3C$b$) to determine a voltage command (manipulated variable) $V_{cmd}$ of the laser oscillator, and the laser oscillator 3C$c$ is driven by this voltage command $V_{cmd}$.

Figure 9:
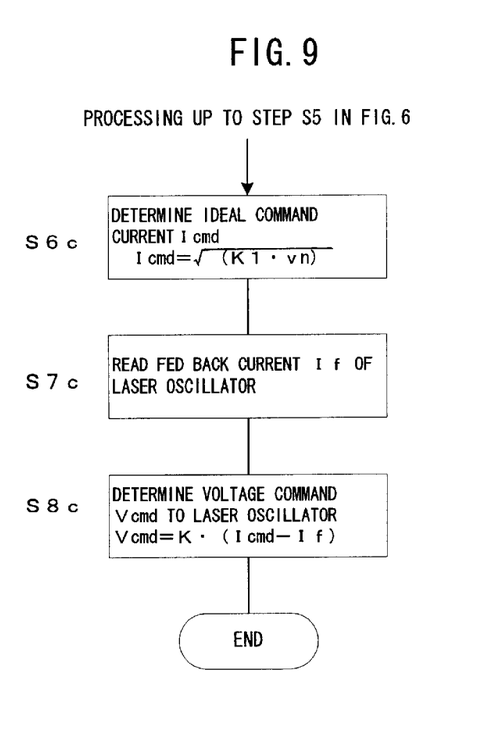
FIG. 9 is a flowchart for processing in a process control section when the peripheral equipment is a laser beam machine.

FIG. 9 is a flowchart for processing executed in place of Steps S6, S7 and S8 in FIG. 6 in the case where the peripheral equipment to be process controlled is a laser beam machine.

The main processor 1 of the robot controller performs the processing in Steps S1 to S5 shown in FIG. 6 to determine the velocity $v_n$ of nozzle tip of the laser beam machine, and performs the calculation of Eq. (6) using this velocity to determine the target current command $I_{cmd}$ (Step S6$c$). Then, a value obtained by subtracting the fed back value $I_f$ of a measured value of driving current of the laser oscillator, which is measured by a sensor, from the target current command $I_{cmd}$ is multiplied by the proportional gain K to determine the voltage command $V_{cmd} (= K \cdot (I_{cmd} - I_f)$ to the laser oscillator as the manipulated variable, and the voltage command $V_{cmd}$ is given to the laser oscillator via the external input/output interface 6 (Steps S7$c$ and S8$c$).

Subsequently, the processing in Steps S1 to S5 and Steps S6$c$, S7$c$ and S8$c$ is executed for each predetermined period. The target commanded current $I_{cmd}$ is changed according to the movement velocity of the laser beam machining head, and feedback control is carried out so that the driving current value of the laser oscillator, which is detected by the sensor, agrees with the target commanded current $I_{cmd}$. Therefore, even if the movement velocity of the laser beam machining head changes, energy per unit movement distance applied by the laser beam machine is made constant, so that laser beam machining such as cutting of uniform quality can be achieved.

In the peripheral equipment which applies a substance or energy to an object through the operational tool mounted on the distal end of the robot wrist, even if the state of robot changes, the robot controller carries out the process control for applying the substance or energy according to the change, so that the substance or energy can always be applied uniformly. Thereby, machining of high quality can be achieved.

What is claimed is:

1. A robot controller comprising:
   motion control means for moving an operational tool mounted on a robot with respect to an object;
   supply means for supplying energy to be applied to the object through the operational tool;
   supply control means for issuing a supply command to said supply means; and
   means for feeding back a parameter representing power of the energy supplied through the operational tool to alter the supply command based on the fed back parameter and a target value of the fed back parameter, the target value being dynamically determined based on a motion variable of a tool center point of the operational tool in motion obtained by said motion control means.

2. A robot controller for an arc welding operation according to claim 1, wherein the motion variable is a speed of a control point of the robot relative to the object, said supply means is a power source for supplying a welding current, and the parameter is the welding current.

3. A robot controller for a laser welding operation according to claim 1, wherein the motion variable is a speed of a control point of the robot with respect to the object, said supply means is a laser oscillator for supplying a laser beam, and the parameter is an excitation current of said laser oscillator.

4. A robot controller for controlling a robot comprising:
   motion control means for moving an operational tool with respect to an object;
   supply means for supplying energy to an operational substance to be fused so as to apply the fused operational substance to the object through the operational tool;
   supply control means for issuing a supply command to said supply means; and
   means for feeding back a parameter representing power of the energy supplied from the operational tool to alter the supply command based on the fed back parameter and a target value of the fed back parameter, the target value being dynamically determined based on a motion variable of a tool center point of the operational tool in motion obtained by said motion control means.

5. A robot controller for arc welding according to claim 4, wherein the motion variable is a speed of a control point of the robot relative to the object, said supply means is a power source for supplying a welding current to filler metal, and the parameter is the welding current.

6. A robot controller for controlling a robot comprising:
   motion control means for moving an operational tool with respect to an object;
   supply means for supplying an operational substance to be applied to the object through the operational tool;
   supply control means for issuing a supply command to said supply means; and
   means for feeding back a parameter representing a supply rate of the operational substance from the operational tool to alter the supply command based on the fed back parameter and a target value of the fed back parameter, the target value being dynamically determined based on a motion variable of a tool center point of the operational tool in motion obtained by said motion control means.

7. A robot controller for a sealing operation according to claim 6, wherein the operational variable is a speed of a control point of the robot with respect to the object, said supply means is an electric motor for driving a pump for supplying a sealing material, and the parameter is a pressure of the sealing material at an outlet of the operational tool.

8. A robot controller for a painting operation according to claim 6, wherein the operational variable is a speed of a control point of the robot with respect to the object, said supplying means is an electric motor for driving a pump for supplying paint, and the parameter is a pressure of the paint at an outlet of the operational tool.

9. A robot controller comprising:
   a motion control unit moving an operational tool mounted on a robot with respect to an object;
   a supply unit supplying energy to be applied to the object through the operational tool;
   a supply control unit issuing a supply command to said supply unit; and
   a feedback unit feeding back a parameter representing power of the energy supplied through the operational tool to alter the supply command based on the fed back parameter and a target value of the fed back parameter, the target value being dynamically determined based on a motion variable of a tool center point of the operational tool in motion obtained by said motion control unit.

10. A robot controller for controlling a robot comprising:
    a motion control unit moving an operational tool with respect to an object;
    a supply unit supplying energy to an operational substance to be fused so as to apply the fused operational substance to the object through the operational tool;
    a supply control unit issuing a supply command to said supply unit; and
    a feedback unit feeding back a parameter representing power of the energy supplied from the operational tool to alter the supply command based on the fed back parameter and a target value of the fed back parameter, the target value being dynamically determined based on a motion variable of a tool center point of the operational tool in motion obtained by said motion control unit.

11. A robot controller for controlling a robot comprising:
    a motion control unit moving an operational tool with respect to an object;
    a supply unit supplying an operational substance to be applied to the object through the operational tool;
    a supply control unit issuing a supply command to said supply unit; and
    a feedback unit feeding back a parameter representing a supply rate of the operational substance from the operational tool to alter the supply command based on the fed back parameter and a target value of the fed back parameter, the target value being dynamically determined based on a motion variable of a tool center point of the operational tool in motion obtained by said motion control unit.

12. A controller for a robot having a tool mounted on an arm of the robot for operating on an object, comprising:
    a supply controller providing a supply command to the object; and
    a feedback unit feeding back a parameter to be controlled, wherein the supply command is based upon the fed back parameter and a target value of the parameter to be controlled, the target value being dynamically determined based on a motion variable of a tool center point of the tool in motion.

13. A method of controlling a robot having a tool mounted on an arm of the robot for operating on an object, comprising:

providing a supply command to the object; and feeding back a parameter to be controlled, wherein the supply command is based upon the fed back parameter and a target value of the parameter to be controlled, the target value being dynamically determined based on a motion variable of a tool center point of the tool in motion.

* * * * *